United States Patent [19]
Weng

[11] Patent Number: 5,822,822
[45] Date of Patent: Oct. 20, 1998

[54] COMPACT DISC CLEANING DEVICE

[75] Inventor: Jin-Sheng Weng, Taipei, Taiwan

[73] Assignee: Bor Ying Corporation, Taipei Hsien, Taiwan

[21] Appl. No.: 848,938

[22] Filed: May 1, 1997

[30]     Foreign Application Priority Data

May 7, 1996 [CN] China ................................. 85206660

[51] Int. Cl.⁶ ............................ A47L 25/00; B08B 11/02; G11B 3/58
[52] U.S. Cl. ....................... 15/97.1; 15/DIG. 14; 369/72
[58] Field of Search .................. 15/97.1, 102, DIG. 14; 369/72

[56]             References Cited

U.S. PATENT DOCUMENTS

| 4,750,231 | 6/1988 | Kogashiwa | ................................ | 15/97.1 |
| 4,783,870 | 11/1988 | Yeung | ...................................... | 15/97.1 |
| 4,825,497 | 5/1989 | Nagao et al. | ............................ | 15/97.1 |
| 5,584,089 | 12/1996 | Huang | ..................................... | 15/97.1 |

*Primary Examiner*—Terrence Till
*Attorney, Agent, or Firm*—Pro-Techtor International Services

[57]                ABSTRACT

A compact disc cleaning device including a seat, a cover pivotally connected to one edge of the seat, and a rotatable wheel. The seat has a circular recess portion with teeth provided along an inner peripheral wall thereof. The rotatable wheel includes a hand cap and a wheel body connected to a lower axis portion of the hand cap. The wheel body has a cleaning element attached to a bottom side thereof and has teeth formed along an outer peripheral wall thereof to mesh with the teeth on the peripheral wall of the circular recess portion of the seat, such that the rotatable wheel can move in rotation along the toothed inner peripheral wall of the circular recess portion in the seat, allowing the cleaning element at the bottom side of the wheel body to wipe clean a compact disc positioned in the circular recess portion. The circular recess portion is further formed of a central recess, an inner annular recess, an intermediate partition ring, and an outer annular recess. The intermediate partition ring separate the inner annular recess from the outer annular recess, so that the inner and the outer annular recesses are adapted to separately support a differently sized compact disc thereon for cleaning purpose. A compartment is formed near one edge of the seat so that a cleaning liquid container can be conveniently and orderly received within the seat.

4 Claims, 2 Drawing Sheets

COMPACT DISC CLEANING DEVICE

FIELD OF THE INVENTION

The present invention relates to an improved compact disc cleaning device which may be used to conveniently and effectively clean compact disc in different sizes.

DESCRIPTION OF THE PRIOR ART

Due to the highly developed industrial technologies and the constantly improved quality of our living, more and more people consider their activities in leisure life an important thing. An example of such leisure activities is to enjoy audio and video apparatus with high fidelity. A compact disc, either an audio or a video compact disk, due to its high fidelity, it has been widely accepted by people and is very popular among families, restaurants, and many audiovisual centers.

Even it is a high quality product under advanced technology, the compact disc, just as any other products, needs periodical or non-periodical cleaning as a maintenance thereof, so as to keep its high quality and to prolong its usable life.

Due to the specially formed fine lines on the compact disc, it is necessary to clean the compact disc in a radial direction. That is, to wipe the compact disc in a radial direction from a center of the disc toward a circumferential periphery of the disc, or from the circumferential periphery of the disc toward the center thereof radially. More particularly, a cleaning means used to wipe the compact disc must be moved always in a direction perpendicular to the circumference of the disc. Cleaning the compact disc by wiping its surface in a direction parallel to the circumference will destroy the fine lines formed on the disc surface and seriously and adversely affect the quality thereof or even completely destroy the disc.

There has been many compact disc cleaning means proposed based on the above mentioned cleaning principle. However, these conventional compact disc cleaning means can usually used to clean only discs in the same size. They are not able to clean compact discs of different sizes. That is, when there are compact discs of different sizes to be cleaned, such as a 3-inch and a 5-inch compact disc, then, two different sets of cleaning means respectively for cleaning 3-inch and 5-inch discs must be prepared. Moreover, the conventional compact disc cleaning means usually work with a separated cleaning liquid container. This causes not only difficulties in provision of a unified and uniform space for storing the cleaning means and the cleaning liquid container, but also inconvenience to users.

It is therefore desirable to develop a simple but effective compact disc cleaning device to eliminate the drawbacks existing in the conventional compact disc cleaning means.

SUMMARY OF THE INVENTION

The compact disc cleaning device according to the present invention mainly includes a seat and a cover mutually pivotally connected at one edge, and a rotatable wheel. The seat is formed with a circular recess. Inner teeth are formed along an inner peripheral wall of the circular recess. The rotatable wheel includes a hand cap and a wheel body mutually fixedly connected at their central axis portions. The wheel body is provided at a lower surface with a cleaning element and at an outer peripheral wall with a plurality of outer teeth to mesh with the inner teeth of the seat, such that the rotatable wheel can move in rotation along the inner peripheral wall of the circular recess of the seat. When the rotatable wheel rotates, the cleaning element at its bottom surface wipes a compact disc positioned in the circular recess of the seat. The compact disc cleaning device is characterized in that the circular recess is further sequentially formed from its center to an outer portion with a central recess, an inner annular recess an intermediate partition ring, and an outer annular recess. The intermediate partition ring is located between the inner and the outer annular recesses to separate them from one another, such that the two annular recesses may be separately used to support a differently sized compact disc thereon for the cleaning element below the rotatable wheel to clean it. Another feature of the present invention is that the seat is provided along one edge with a compartment for receiving a cleaning liquid container therein, so that the cleaning liquid container can always be fitly positioned inside the compact disc cleaning device.

BRIEF DESCRIPTION OF THE DRAWINGS

The structure, the features, and the functions of the present invention can be best understood by referring to the following detailed description of the preferred embodiment and the accompanying drawings, wherein.

DETAILED DESCRIPTION OF THE PREFERRED EMBODIMENT

Figure 1:
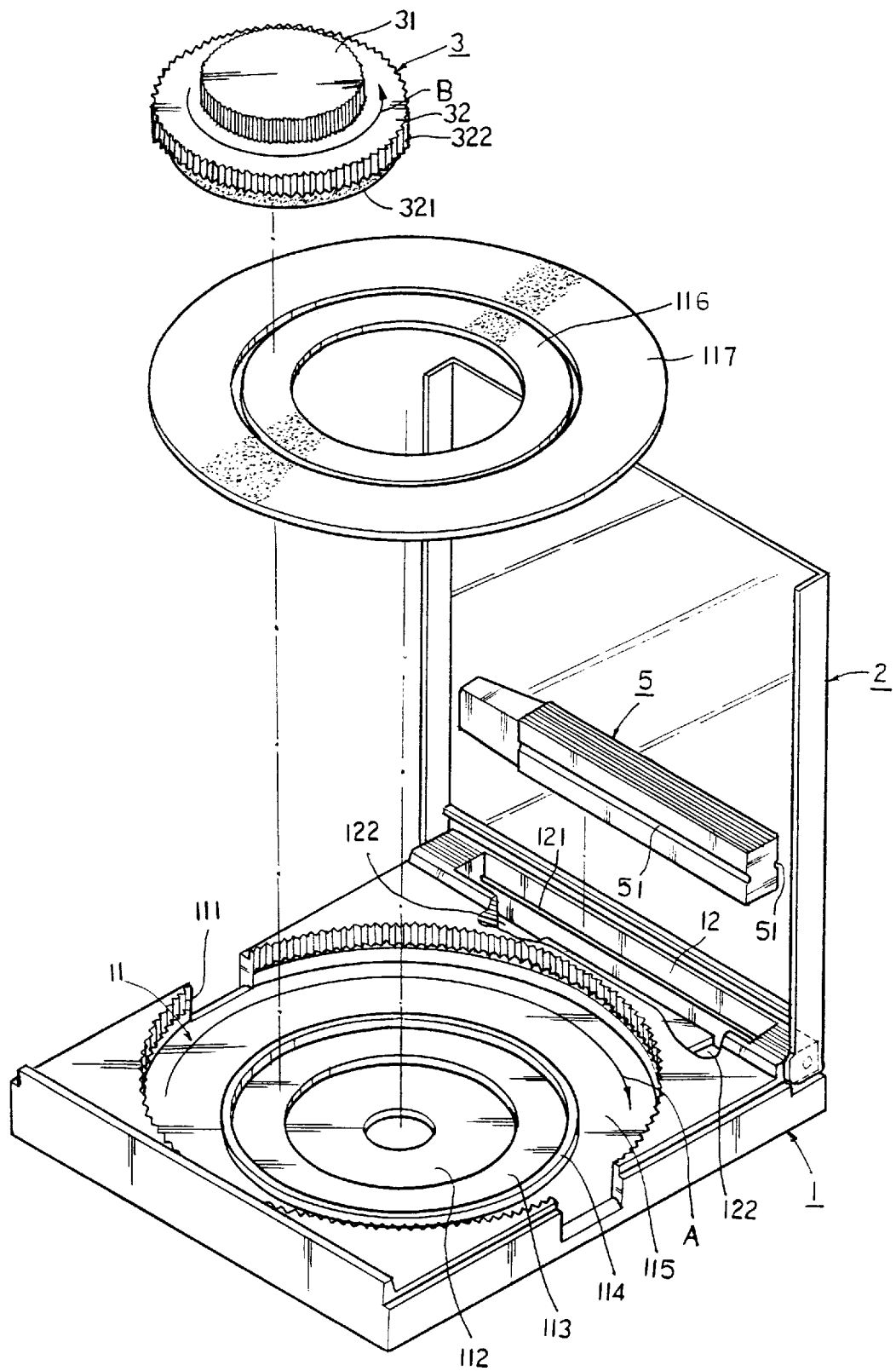
FIG. 1 is an exploded perspective of the present invention.

Please refer to FIG. 1. The present invention relates to a compact disc cleaning device which mainly includes a seat 1, a cover 2, and a rotatable wheel 3.

Figure 4:
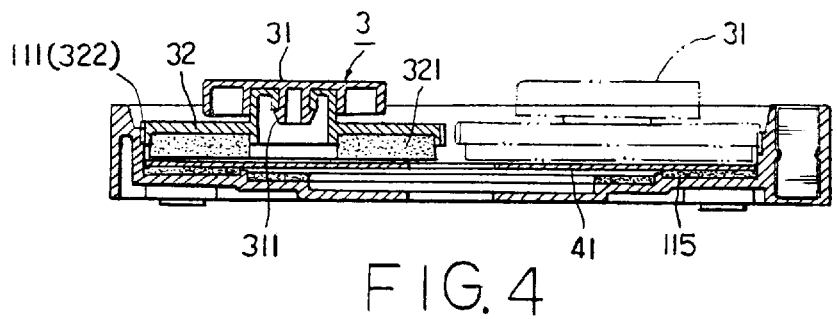
FIG. 4 is a sectional view showing the present invention is used to clean a big-sized (5", for example) compact disc.
Figure 5:
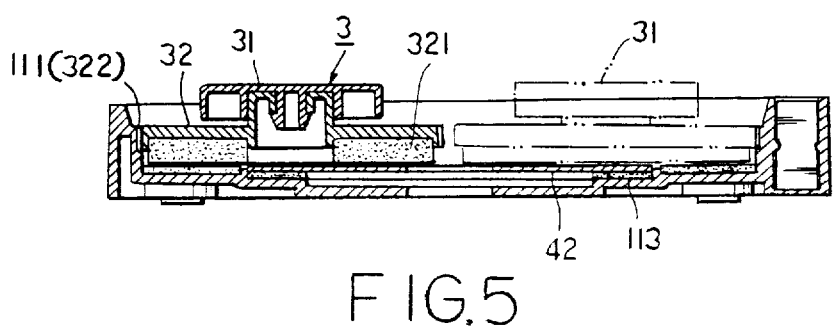
FIG. 5 is similar to FIG. 4 but with a small-sized (3", for example) compact disc being cleaned.

The seat 1 has a circular recess portion 11 formed therein. The circular recess portion 11 has a plurality of inner teeth 111 provided along an inner peripheral wall thereof. The circular recess portion 11 is further sequentially formed from a center to an outer Peripheral portion with a central recess 112, an inner annular recess 113, an intermediate partition ring 114, and an outer annular recess 115. An inner annular pad 116 and an outer annular pad 117 are laid on the inner annular recess 113 and the outer annular recess 115, respectively. The intermediate partition ring 114 separates the inner annular recess 113 from the outer annular recess 115, so that the inner and the outer annular recess 113 and 115 can be separately used to support a larger and a smaller compact disc, respectively. For example, a 5-inch compact disc 41 can be disposed on the outer annular recess 115, as shown in FIG. 4; and, in another case, a 3-inch compact disc 42 can be disposed on the inner annular recess 113, as shown in FIG. 5.

Figure 2:
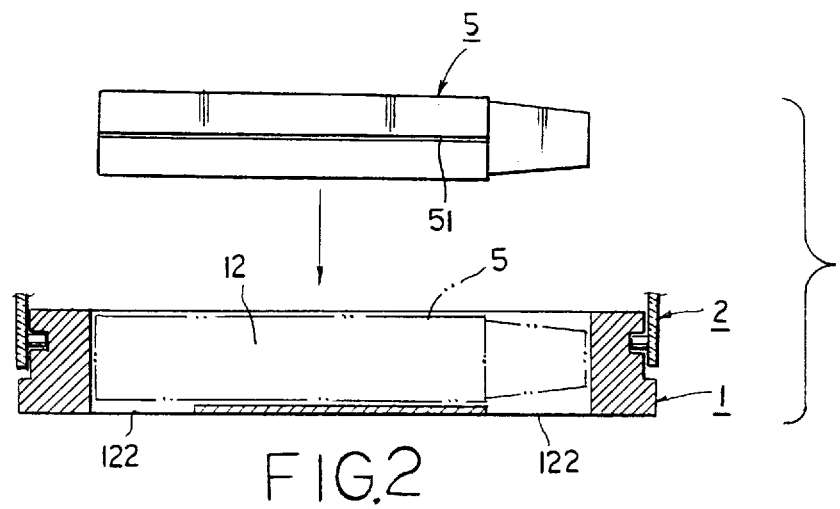
FIG. 2 is a sectional view taken on a longitudinal axis of the cleaning liquid container compartment.

Please now refer to FIGS. 1 and 2 at the same tine. The seat 1 is provided near one edge with a cleaning liquid container compartment 12 for receiving a cleaning liquid container 5 therein. The compartment 12 is provided on two inner side walls with a rib 121 each. The cleaning liquid container 5 is formed on its outer side walls with two grooves 51, such that the container 5 can be positioned in the compartment 12 with its two side grooves 51 engaging with the two ribs 121 of the compartment 12 and thereby be removably set in the compartment 12. Near at least one of two ends of the compartment 12, the compartment 12 is partially cut out to form an opening 122, so that a user may easily extend his one finger into the compartment 12 via the opening 122 to push the cleaning liquid container 5 upward and remove the container 5 from the compartment 12.

The rotatable wheel 3 includes a hand cap 31 having a lower axis portion 311 and a wheel body 32 pivotally connected to a bottom side of the hand cap 31 at the axis portion 311. A cleaning element 321 made of deer skin, for example, is mounted to a bottom surface of the wheel body 32. A plurality of outer teeth 322 are provided along an outer periphery of the wheel body to mesh with the inner teeth 111 of the circular recess portion 11 of the seat 1.

The cover 2 is pivotally connected to one edge of the seat 1. When the compact disc cleaning device is not in use, the cover 2 is normally closed to cover a top of the seat 1. When the compact disc cleaning device is to be used, the cover 2 is pivotally turned outward to expose the circular recess portion 11 and the compartment 12 in the seat 1.

Please refer to FIGS. 1 and 4. To clean a 5-inch compact disc 41 with the present invention, first put the compact disc 41 over the outer annular recess 115 on the seat 1, then put the rotatable wheel 3 in the circular recess portion 11 such that the outer teeth 322 of the rotatable wheel 3 mesh with the inner teeth 111 at any location of the circumferential periphery of the circular recess portion 11. Then, operate the rotatable wheel 32 so that it moves along the toothed inner peripheral wall of the circular recess portion 11 in a direction as shown by the arrow A, forming a revolution of the wheel 32 round the center of the seat 1. Meanwhile, due to the moving of the rotational wheel 32 along the inner peripheral wall of the circular recess portion 11 by meshing the outer teeth 322 with the inner teeth 111, a rotation of the wheel 32 round the axis portion 311 of the hand cap 31 in a direction as shown by the arrow B is formed. That is, the rotational wheel 32 moves in rotation within an area defined by a radius of the compact disc 41. The rotation of the wheel 32 at the same time of the revolution of the wheel 32 round the center of the circular recess portion 11 acts on the compact disc 41 and causes the cleaning element 321 at the bottom side of the rotational wheel 32 to wipe each area on the compact disc surface in a direction substantially normal to the circumference of the compact disc 41, and the compact disc 41 is thereby effectively cleaned.

Please refer to FIG. 5. To clean a smaller (3-inch, for example) compact disc 42 with the present invention, first put the compact disc 42 over the inner annular recess 113. Again, operate the rotational wheel 32 so that it moves in rotation round its own center and in revolution round the center of the circular recess portion 11. Then, the compact disc 42 is cleaned in the same manner as described above for cleaning the 5-inch disc 41.

Figure 3:
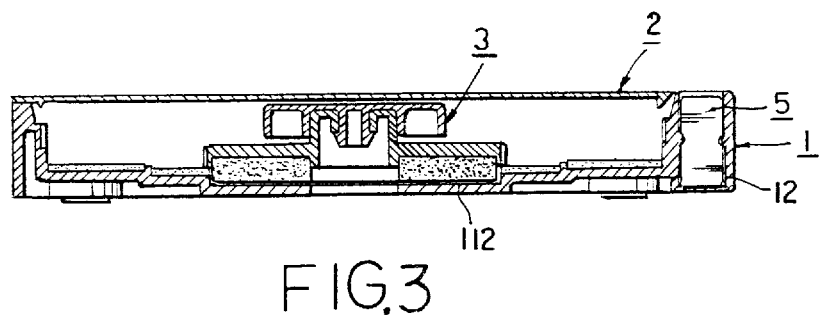
FIG. 3 is a sectional view showing the present invention in an assembled and closed state when it is not in use.

Please refer to FIG. 3. When the present invention is not in use, the rotational wheel 32 and the cleaning liquid container 5 can be positioned in the central recess 112 and the compartment 12, respectively, and then, the cover 2 is closed to the top of the seat 1. The cleaning device of the present invention in a closed state shall have an overall height or thickness only about twice of the thickness of a general compact disc storage case. This allows the compact disc cleaning device of the present invention to be conveniently positioned along with other compact disc cases on a disc rack in a uniform and orderly manner.

What is claimed is:

1. A compact disc cleaning device, comprising:

a seat having a circular recess portion which is provided at an inner peripheral wall with a plurality of inner teeth;

a cover being pivotally connected to an edge of said seat; and a rotational wheel including a hand cap and a wheel body pivotally connected to a lower axis portion of said hand cap, said wheel body being provided at a bottom side with a cleaning element and at an outer peripheral wall with a plurality of outer teeth to mesh with said inner teeth of said circular recess portion of said seat, such that said rotational wheel is allowed to move in rotation along said inner peripheral wall of said circular recess portion;

said circular recess portion of said seat being sequentially formed from a center to an outer portion with a central recess, an inner annular recess, an intermediate partition ring, and an outer annular recess; said intermediate partition ring separating said inner annular recess from said outer annular recess, so that said inner and said outer annular recesses are adapted to separately support a differently sized compact disc thereon for cleaning purpose; and said seat being provided near one edge with a compartment to receive a cleaning liquid container therein, so that said cleaning liquid container can be integrally stored inside said compact disc cleaning device.

2. A compact disc cleaning device as claimed in claim 1, wherein said compartment formed in said seat has two inner side walls each with a rib formed thereon, and said cleaning liquid container having outer side walls with two grooves formed thereon corresponding to said two ribs, so that said cleaning liquid container is firmly positioned in said compartment by engagement of said grooves with said ribs.

3. A compact disc cleaning device as claimed in claim 2, wherein said compartment formed in said seat is partially cut out to provide an opening near at least one end of said compartment, so that said cleaning liquid container can be conveniently pushed upward with a finger and be removed from said compartment.

4. A compact disc cleaning device as claimed in claim 1, wherein said compartment formed in said seat is partially cut out to provide an opening near at least one end of said compartment, so that said cleaning liquid container can be conveniently pushed upward with a finger and be removed from said compartment.

* * * * *